Patented Oct. 3, 1922.

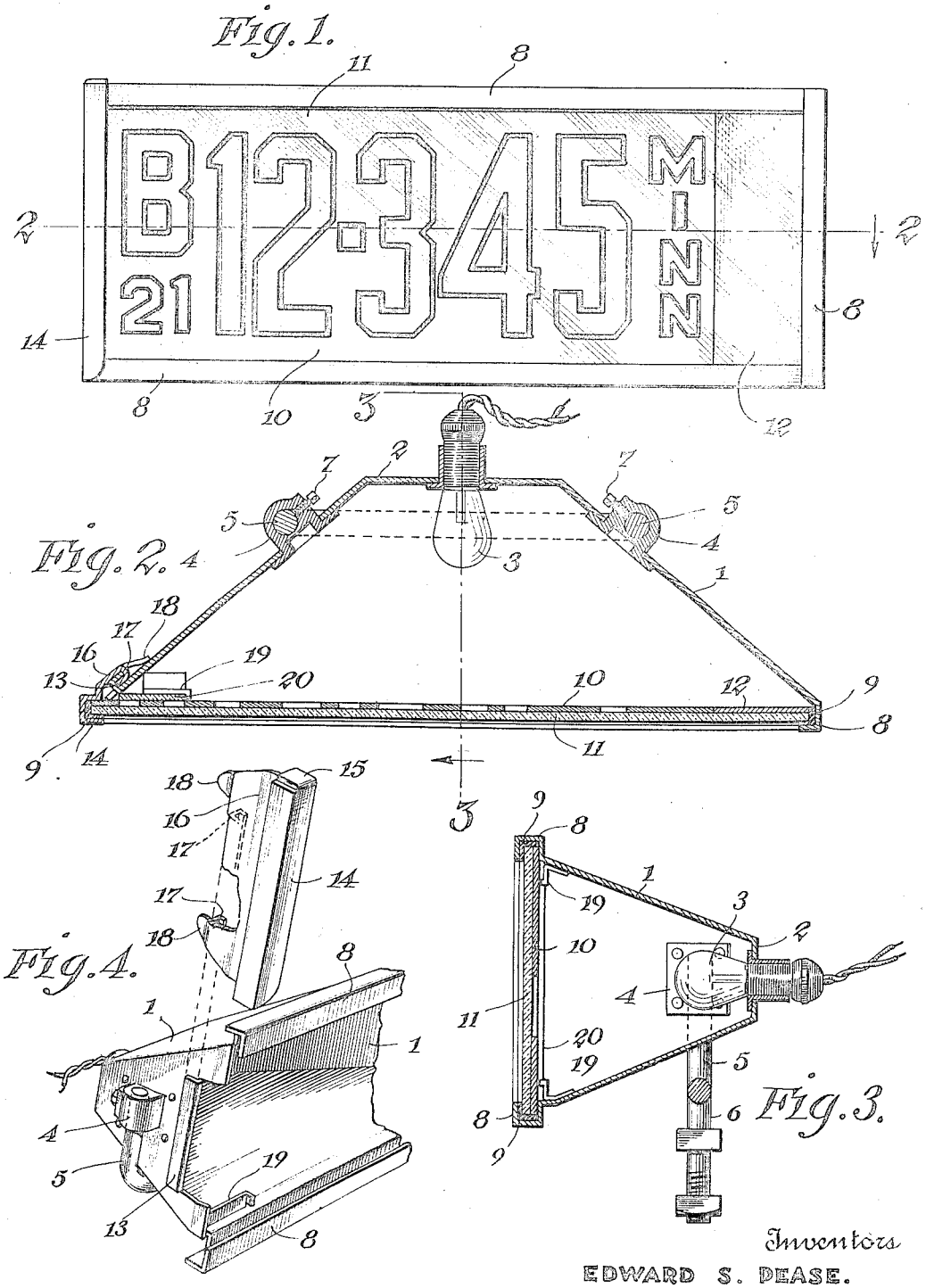

1,430,845

UNITED STATES PATENT OFFICE.

EDWARD S. PEASE AND FLOYD REYNOLDS, OF REDWOOD FALLS, MINNESOTA.

ILLUMINATED LICENSE TAG.

Application filed May 2, 1922. Serial No. 557,901.

*To all whom it may concern:*

Be it known that we, EDWARD S. PEASE and FLOYD REYNOLDS, citizens of the United States, residing at Redwood Falls, in the county of Redwood and State of Minnesota, have invented certain new and useful Improvements in Illuminated License Tags, of which the following is a full, clear, and exact description.

Our invention relates to illuminated license tags, and one of the objects thereof is to provided a device of this character which will be simple in construction, inexpensive in manufacture, and practical in operation.

Another advantage of the invention resides in the provision of a red glass or red prism adjacent one end of the device, whereby the ordinary tail light is combined with the illuminated license tag.

Another advantage of the invention resides in the provision of a glass plate completely covering the license tag, whereby the tag and the interior of the holder are protected from the dust, etc.

Still another object of the invention is to provided a device of this character which is adapted to receive and hold license tags of various lengths.

A further object of the invention is to provide a device of this character which may be connected to the original tail light; thus avoiding the necessity for any additional wiring.

Another object of the invention resides in the provision of a device of this character which is highly ornamental in appearance.

Other and further objects and advantages of the invention will appear in the following detailed description, when taken in connection with the accompanying drawings, in which:

Figure 1 is a front elevation of the device.

Figure 2 is a horizontal sectional view taken on line 2—2 of Figure 1.

Figure 3 is a vertical sectional view taken on line 3—3 of Figure 2, and

Figure 4 is a fragmentary perspective view of the holder, with the license tag and glass removed, and the sliding end door lifted clear of engagement with the holder.

Referring to the drawings more in detail, numeral 1 indicates the lamp box, which is made of thin sheet metal, and preferably of one piece. The top and bottom walls of the lamp box, and also the side walls thereof, converge toward the rear, thereby forming a relatively small rear wall 2 in which is mounted an electric bulb 3. It will be understood, of course, that the bulb may be mounted in any one of the other walls, if preferred. When the device is mounted on the rear of the car the bulb will be connected with the usual tail light wires. Lugs 4, 4 are attached to the side walls of the lamp box, and these lugs are adapted to receive the tines 5, 5 of a forked bracket 6. The lamp box is adjustably and removably secured to the tines of the bracket by means of set-screws 7, 7.

The top and bottom walls and the right hand side wall (Figure 2) are shaped to form a flange 8 extending around three sides of the open front of the lamp box. A rubber gasket 9 is arranged in the flange to prevent breakage of the glass. For reasons to appear hereinafter, the left hand wall (Figure 2 and 4) is not flanged in the manner above described.

The license tag, indicated by numeral 10, is of the conventional type, except that it is stenciled instead of being pressed. And it is desirable that the numbers be heavily outlined in order that they will stand out clearly during the day. The tag is carried by the flange 8 and is mounted in place by merely sliding it through the open ends of said flange. A plate of glass 11 is also carried by the flange 8 and is mounted in front of the license tag, thereby preventing the accumulation of dust on the license tag and on the interior of the lamp box. The glass is set in the rubber gasket 9, previously mentioned; the purpose of the gasket being to prevent breakage of the glass as a result of jarring incident to the running of the car.

The length of the license tags varies in different States, and in some States the length of the tag varies in accordance with the number of figures in the license number. For this reason it is highly desirable that some means be provided whereby the lamp box will be adapted to receive license tags of various lengths. The means which we have devised for this purpose consists in the use of one or more filler plates, indicated by numeral 12. In the particular embodiment of the invention illustrated, we have shown a short license tag used in conjunction with a single filler plate. Of course, the filler plates may be of any desired size, and instead of using a single plate, as indicated in the drawings, we may prefer to use a smaller filler plate at each end of the license tag.

We will now describe the end door and the means by which it is mounted on the lamp box.

A portion of the left hand side wall (Figure 4) is cut away and turned back to form a flange, as indicated by numeral 13. The end door comprises a channel portion 14 which slides over the ends of the flanges 8; the upper end of the channel portion being closed by bending over the end portion of one of the channel walls, the closing tab being indicated by numeral 15. Extending rearwardly from the channel member 14 is a tongue 16, and a portion of the tongue is bent inwardly, and forwardly to form a flange 17. Resilient fingers 18, 18 extend rearwardly from the tongue 16.

The operation of the sliding door will be apparent from the above description. To mount the door in place the lower end of the channel member 14 is engaged over the end of the upper flange 8, and the door is then pushed downwardly, whereby the flange 17 engages behind the flange 13 and secures the door in place. When the door has been pushed all the way down to its normal position the lower end of the channel member will engage over the end of the lower flange 8, and the tab 15 engaging the upper flange 8 will prevent any further downward movement of the sliding door. The spring fingers 18 engaging the wall of the lamp holder will prevent any movement of the door as a result of the jarring of the car. A rubber gasket similar to the gasket 9 previously described is mounted in the channel 14. Of course, it is not our intention to be limited to the specific door illustrated, or to the specific means shown for mounting the door, and we may use any other preferable construction; but the door shown and described herein possesses numerous advantages, in that it is light in construction, inexpensive in manufacture, and is easily mounted in place or removed therefrom.

As previously stated herein, one of the objects of the invention is to combine with the illuminated license tag the function of the conventional tail light. For this purpose brackets 19 are provided in the top and bottom of the lamp box adjacent one end thereof, and a red glass plate or red glass prism, indicated by numeral 20, is adapted to be received and held in place by the brackets 19.

It may be mentioned that the bulb 3 is frosted at the end to diffuse the light evenly over all the numbers; and that the inside of the lamp box is polished to reflect the light.

From the foregoing detailed description it will be apparent that we have devised an illuminated license tag possessing numerous advantages over similar devices previously known.

In accordance with the patent statutes, we have described what we now believe to be the best embodiment of our invention, but we do not wish to be understood thereby as limiting ourselves or our invention, as many changes and modifications may be made without departing from the spirit of the invention; and all such we aim to include within the scope of the appended claims.

What we claim as new and desire to secure by Letters Patent is:

1. An illuminated license tag including a lamp box, a flange extending around three sides of the front of said box, a stenciled license tag adapted to be mounted in said flange, brackets arranged in said lamp box adjacent one end thereof, a red glass plate adapted to be mounted in said brackets and extending over a small portion only of the license tag, a door slidably mounted on one end of the box, said door being provided with a channel adapted to receive the end of the license tag.

2. An illuminated license tag including a lamp box, a flange extending around three sides of the front of said box, a rubber gasket provided in said flange, a stenciled license tag adapted to be mounted in said flange, a glass plate also adapted to be mounted in said flange in front of said license tag, brackets arranged in said lamp box adjacent one end thereof, a red glass plate adapted to be mounted in said brackets to the rear of the stenciled license tag and extending over a small portion only of the license tag, a door slidably mounted on one end of the box, said door being provided with a channel adapted to receive the end of the license tag and glass plate, and a rubber gasket provided in said channel.

3. An illuminated license tag including a lamp box, a flange extending around three sides of said box, a stenciled license tag adapted to be mounted in said flange, a door slidably mounted on one end of said box, said door including a channel adapted to engage the end of the license tag, a tongue extending rearwardly from the channel, a flange formed on said tongue, and a flange formed on the lamp box wall adapted to receive the flange on said door.

4. An illuminated license tag including a lamp box, a flange extending around three sides of said box, a stenciled tag adapted to be mounted in said flange, a door slidably mounted on one end of said box, said door including a channel adapted to engage one end of the license tag, a tongue extending rearwardly from the channel, a flange formed on said tongue, a flange formed on the lamp box wall and adapted to receive the flange on said door, and resilient fingers extending rearwardly from said tongue and adapted to frictionally engage the wall of the lamp box.

EDWARD S. PEASE.
FLOYD REYNOLDS.